United States Patent
Zou

(10) Patent No.: US 12,111,998 B2
(45) Date of Patent: Oct. 8, 2024

(54) TOUCH CONTROL METHOD AND APPARATUS, DEVICE AND STORAGE MEDIUM

(71) Applicant: Beijing Xiaomi Mobile Software Co., Ltd., Beijing (CN)

(72) Inventor: Jialiang Zou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/193,535

(22) Filed: Mar. 30, 2023

(65) Prior Publication Data

US 2024/0176449 A1    May 30, 2024

(30) Foreign Application Priority Data

Nov. 28, 2022 (CN) .......................... 202211506110.6

(51) Int. Cl.
*G06F 3/041* (2006.01)
*G06F 3/044* (2006.01)

(52) U.S. Cl.
CPC .......... *G06F 3/04182* (2019.05); *G06F 3/044* (2013.01)

(58) Field of Classification Search
CPC ................... G06F 3/04182; G06F 3/044–0448
See application file for complete search history.

(56) References Cited

U.S. PATENT DOCUMENTS

| | | | |
|---|---|---|---|
| 11,269,455 B1 | 3/2022 | Derichs et al. | |
| 2013/0207935 A1* | 8/2013 | Toda | G06F 3/0446 345/174 |
| 2013/0278543 A1* | 10/2013 | Hsu | G06F 3/0446 345/174 |
| 2015/0242051 A1* | 8/2015 | Ng | G06F 3/0418 345/174 |
| 2015/0268796 A1 | 9/2015 | Tsuyuzaki et al. | |
| 2016/0259448 A1* | 9/2016 | Guarneri | G06F 3/04186 |
| 2016/0282980 A1 | 9/2016 | Chintalapoodi et al. | |
| 2017/0052625 A1* | 2/2017 | Bryant | G06F 3/04883 |
| 2018/0059866 A1* | 3/2018 | Drake | G06F 3/0446 |
| 2018/0275825 A1* | 9/2018 | Drake | G06F 3/0443 |
| 2018/0307375 A1* | 10/2018 | Shah | G06F 3/04186 |
| 2022/0300141 A1* | 9/2022 | Dou | G06F 3/044 |

\* cited by examiner

*Primary Examiner* — David Tung
(74) *Attorney, Agent, or Firm* — McCoy Russell LLP

(57) ABSTRACT

A touch control method includes: acquiring, in response to a touch operation detected on a touch screen of a terminal, capacitance signals at a plurality of locations corresponding to the touch operation; determining, in a case of determining that liquid exists on the touch screen based on the capacitance signals at the plurality of locations, an effective area of the touch operation based on the plurality of locations; and executing a function corresponding to the touch operation based on the effective area of the touch operation.

17 Claims, 10 Drawing Sheets

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 0 | 0 | -40 | -50 | -30 | 0 | 0 |
| 0 | 0 | 0 | 0 | 0 | -45 | -20 | 523 | 587 | 524 | 10 | 0 |
| -15 | -51 | -24 | -3 | -1 | 122 | 455 | 654 | 680 | 489 | 22 | 0 |
| 1 | 0 | -1 | 2 | 4 | 523 | 598 | 526 | 600 | 123 | 5 | 0 |
| 2 | 0 | -2 | 3 | 3 | 551 | 548 | 555 | 510 | 247 | -4 | 1 |
| 4 | 0 | -1 | 157 | 233 | 66 | 55 | 22 | 89 | 67 | -5 | 2 |
| 4 | 0 | -1 | -48 | 320 | 142 | -5 | -7 | 5 | 9 | 8 | 2 |
| 4 | 525 | 275 | 157 | 67 | 15 | 12 | 1 | 4 | 9 | 6 | 2 |
| 5 | -111 | -158 | 11 | 12 | 44 | 45 | 12 | -24 | -34 | 1 | 0 |
| 6 | 0 | 0 | 0 | 0 | 0 | 0 | 0 | 0 | 0 | 0 | 1 |
| 1 | 0 | 0 | 1 | 0 | 0 | 3 | 3 | 2 | 1 | 2 | 0 |

Fig. 5

TOUCH CONTROL METHOD AND APPARATUS, DEVICE AND STORAGE MEDIUM

CROSS REFERENCE TO RELATED APPLICATION

The disclosure is provided based on and claims priority to the Chinese Patent Application No. 202211506110.6, filed on Nov. 28, 2022, the entire contents of which are incorporated herein by reference.

BACKGROUND

With widely popularization and application of a terminal, more and more users use various service functions provided by the terminal. The users control the terminal by operating a touch screen of the terminal.

SUMMARY

Examples of the disclosure provide a touch control method and apparatus, a device and a storage medium, the technical solution is as follows.

At one aspect, a terminal touch control method is provided, including:
- acquiring, in response to a touch operation detected on a touch screen of a terminal, capacitance signals at a plurality of locations corresponding to the touch operation;
- determining, in a case of determining that liquid exists on the touch screen based on the capacitance signals at the plurality of locations, an effective area of the touch operation based on the plurality of locations; and
- executing a function corresponding to the touch operation based on the effective area of the touch operation.

At one aspect, a terminal touch control apparatus is provided, including:
- an acquiring module, configured to acquire, in response to a touch operation detected on a touch screen of a terminal, capacitance signals at a plurality of locations corresponding to the touch operation;
- a determining module, configured to determine, in a case of determining that liquid exists on the touch screen based on the capacitance signals at the plurality of locations, an effective area of the touch operation based on the plurality of locations; and
- an executing module, configured to execute a function corresponding to the touch operation based on the effective area of the touch operation.

At one aspect, a terminal is provided. The terminal includes one or more processors and one or more memories, at least one program code is stored in the one or more memories, and the at least one program code is loaded and executed by the one or more processors to implement an operation executed by the touch control method described in any of the above possible implementations.

At one aspect, a non-transitory computer readable storage medium is provided. The non-transitory storage medium stores at least one program code, and the at least one program code is loaded and executed by a processor to implement an operation executed by the touch control method described in any of the above possible implementations.

At one aspect, a computer program or a computer program product is provided. The computer program or the computer program product includes: a computer program code. The computer program code, when executed by a terminal, causes the terminal to implement an operation executed by the touch control method described in any of the above possible implementations.

BRIEF DESCRIPTION OF THE DRAWINGS

In order to illustrate technical solutions in the examples of the disclosure more clearly, drawings needing to be used in description of the examples will be introduced below briefly. Apparently, the drawings in the following description are merely some examples of the disclosure, and those ordinarily skilled in the art can further obtain other drawings according to these drawings without inventive efforts.

FIG. 5 is a schematic diagram of a capacitance signal of a touch screen provided by an example of the disclosure.

DETAILED DESCRIPTION

In order to make objectives, technical solutions and advantages of the disclosure clearer, the implementations of the disclosure will be described further in detail with reference to the drawings.

It can be understood that terms "first", "second" and the like used in the disclosure may be used to describe various concepts in this text, but unless otherwise specified, these concepts are not limited by these terms. These terms are merely used to distinguish one concept from another.

For terms "at least one", "a plurality of", "each" and "any" used in the disclosure, "at least one" includes one, two or more, and "a plurality of" includes two or more, while "each" refers to each of the corresponding plurality of, and "any" refers to any one of the plurality of. For example, the plurality of locations include three locations, "each" refers to each of the three locations, and "any" refers any one of the three location, and may be the first, the second or the third.

It should be noted that information (including but not limited to user equipment information, user personal information, etc.), data (including but not limited to data used for analysis, stored data, displayed data, etc.) and signals involved in the disclosure are all authorized by a user or fully authorized by all parties, and collection, use and processing of relevant data need to comply with relevant laws, regulations and standards of relevant countries and regions. For example, positioning information involved in the disclosure is acquired with full authorization. The above information and data are processed, then used in a big data application scenario, and cannot be identified to any natural person or have a specific relationship with it.

The disclosure relates to the technical field of computers, in particular to a touch control method and apparatus, a device and a storage medium.

In general, the users control the terminal by operating a touch screen of the terminal. In this process, if liquid exists on the touch screen of the terminal, when the users operate on the touch screen, the liquid will hinder the terminal from detecting a touch operation on the touch screen, resulting in difference between a function executed by the terminal and a function corresponding to the touch operation, causing misoperation of the terminal, and thus affecting an efficiency of the users in executing the touch operation.

In some examples, a touch control method provided by an example of the disclosure is executed by a terminal.

In some other examples, the touch control method provided by the example of the disclosure is executed by the terminal and a server. The server may be one server, or a server cluster composed of several servers, or a cloud computing service center.

It should be noted that the example of the disclosure does not limit an executive subject of the touch control method.

Figure 1:
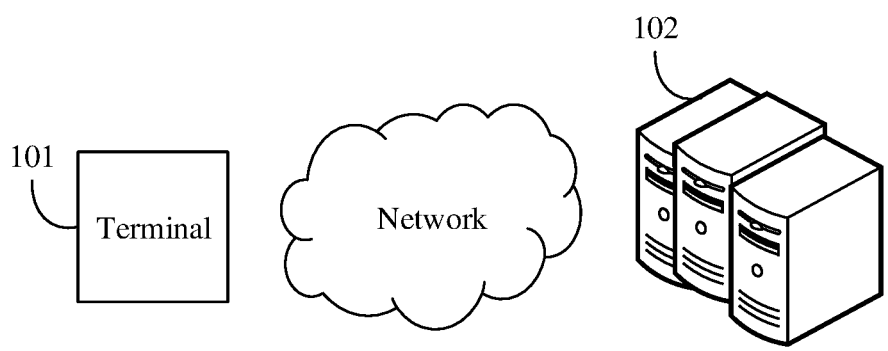
FIG. 1 is a schematic diagram of an implementation environment provided by an example of the disclosure.

FIG. 1 is a schematic diagram of an implementation environment provided by the example of the disclosure. As shown in FIG. 1, the implementation environment includes a terminal 101 and a server 102. The terminal 101 and the server 102 are connected through wireless or wired networks.

The server 102 is a server that provides the terminal 101 with services related to judging whether liquid exists on a touch screen. In some examples, the terminal 101 acquires, in response to a touch operation detected on the touch screen of the terminal 101, capacitance signals at a plurality of locations corresponding to the touch operation and sends them to the server 102. The server 102 judges whether the liquid exists on the touch screen of the terminal 101 based on the capacitance signals at the plurality of locations, and then sends a judgment result to the terminal 101. If the terminal 101 judges that the liquid exists on the touch screen according to the judgment result, an effective area of the touch operation is determined based on the plurality of locations, and then a function corresponding to the touch operation is executed.

Figure 2:
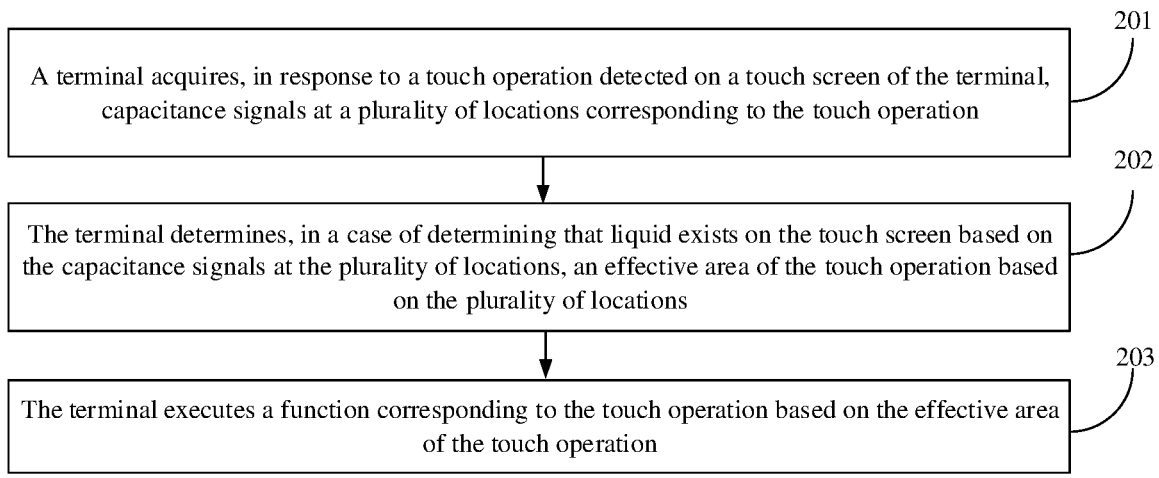
FIG. 2 is a flow diagram of a touch control method provided by an example of the disclosure.

FIG. 2 is a flow diagram of a touch control method provided by an example of the disclosure. The example of the disclosure takes an executive subject being a terminal as an example to illustrate, and the example includes:

201, the terminal acquires, in response to a touch operation detected on a touch screen of the terminal, capacitance signals at a plurality of locations corresponding to the touch operation.

In some examples, the touch screen is a capacitive touch screen, or other types of touch screens that use capacitance, which is not limited by the example of the disclosure. The touch operation includes a sliding operation, a clicking operation, a double-clicking operation or other types of operation, which is not limited by the example of the disclosure. In some examples, the touch screen is composed of the plurality of locations arranged according to a matrix, and each location corresponds to one capacitance signal. The terminal judges the touch operation triggered by a user by detecting the capacitance signal corresponding to each location.

After detecting the touch operation of the touch screen, the terminal acquires, in response to the touch operation, a capacitance signal changed due to the touch operation among the plurality of locations of the touch screen. Then whether the liquid exists on the touch screen may be determined according to the capacitance signals at the plurality of locations.

202, the terminal determines, in a case of determining that the liquid exists on the touch screen based on the capacitance signals at the plurality of locations, an effective area of the touch operation based on the plurality of locations.

The liquid includes water drops, drinks, liquid condiments and other liquid objects, which is not limited by the example of the disclosure. The effective area refers to an area where the touch operation actually works when the user executes the touch operation on the touch screen.

In the example of the disclosure, the user executes the touch operation on the touch screen to enable the terminal to detect the touch operation. However, since the liquid on the touch screen will affect the terminal to detect the touch operation, the terminal needs to determine whether the liquid exists on the touch screen based on the capacitance signals at the plurality of locations. If it is determined that the liquid exists on the touch screen, the effective area of the touch operation is determined based on the plurality of locations, and areas affected by the liquid are eliminated.

203, the terminal executes a function corresponding to the touch operation based on the effective area of the touch operation.

In the example of the disclosure, after determining the effective area of the touch operation, the terminal judges a type of the touch operation according to the effective area acted by the touch operation, and then executes the functions corresponding to different types of touch operations.

The example of the disclosure provides a solution for eliminating interference of liquid existed on the touch screen to a detection operation. After the terminal detects the touch operation, if it is determined that the liquid exists on the touch screen according to the capacitance signals at the plurality of locations corresponding to the touch operation, the effective area of the touch operation is determined based on the plurality of locations, and then the function corresponding to the touch operation is executed, so as to eliminate the impact of the liquid on the touch operation, and improve the accuracy of the terminal to execute the function corresponding to the touch operation.

Figure 3:
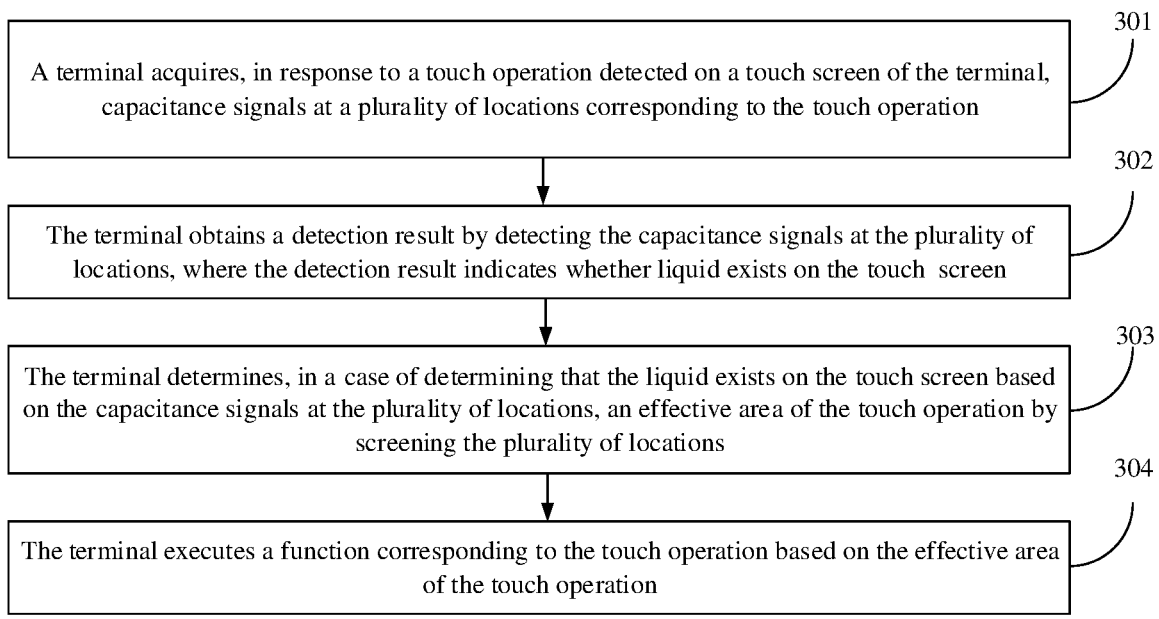
FIG. 3 is a flow diagram of a touch control method provided by an example of the disclosure.

FIG. 3 is a flow diagram of a touch control method provided by an example of the disclosure. The example of the disclosure takes an executive subject being a terminal as an example to illustrate, and the example includes:

301, the terminal acquires, in response to a touch operation detected on a touch screen of the terminal, capacitance signals at a plurality of locations corresponding to the touch operation.

302, the terminal obtains a detection result by detecting the capacitance signals at the plurality of locations, where the detection result indicates whether the liquid exists on the touch screen.

If the liquid exists on the touch screen, impact of the touch operation triggered by a user on the capacitance signal is different from impact of the liquid on the capacitance signal. That is to say, it may be judged that the liquid exists on the touch screen according to difference of the capacitance signals at the plurality of locations. If no liquid exists on the touch screen, the plurality of locations are locations of the touch operation triggered by the user, and it may be judged that no liquid exists on the touch screen.

In some examples, the step of obtaining the detection result by detecting the capacitance signals at the plurality of locations is implemented based on a detection model. That is to say, the terminal obtains the detection result by calling the detection model to detect the capacitance signals at the plurality of locations, and further determines whether the liquid exists on the touch screen based on the detection result.

Alternatively, a training process of the detection model is illustrated. The terminal acquires a sample result of any touch operation, where the sample result indicates whether the liquid exists on the touch screen that triggers any touch operation; and the terminal obtains a predictive detection result by calling the detection model to detect the capacitance signals at the plurality of locations corresponding to any touch operation, and trains the detection model based on the predictive detection result and the sample results of any touch operation.

In the example of the disclosure, a user triggers the touch operation on the touch screen when no water exists on the touch screen, and sets the sample result in this case to be that no liquid exists. The terminal further acquires the capacitance signals at the plurality of locations corresponding to the touch operation, then obtains the predictive detection result by calling the detection model to detect the capacitance signals at the plurality of locations, and trains the detection model according to the predictive detection result and the sample result, so that the detection model has a capability to identify that no liquid exists on the touch screen. Moreover, the user further triggers the touch operation on the touch screen when the water exists on the touch screen, and sets the sample result in this case to be presence of the liquid. The terminal further acquires the capacitance signals at the plurality of locations corresponding to the touch operation, then obtains the predictive detection result by calling the detection model to detect the capacitance signals at the plurality of locations, and trains the detection model according to the predictive detection result and the sample result, so that the detection model has a capability to identify that the liquid exists on the touch screen.

It should be noted that the example of the disclosure takes an example that the terminal trains the detection model to illustrate. In another example, a server may further be used to train the detection model, and the trained detection model is deployed in the terminal for easy use of the terminal.

Figure 4:
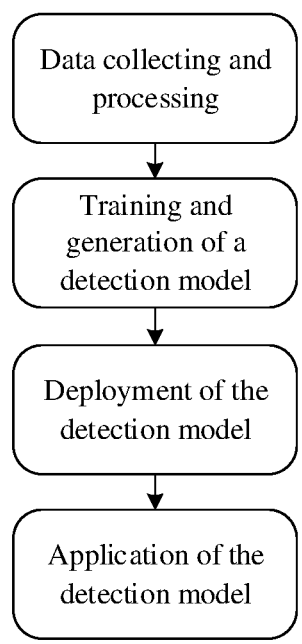
FIG. 4 is a flow diagram of training and application of a detection model provided by an example of the disclosure.

For example, as shown in FIG. 4, from training to application of the detection model, four processes need to be executed: data collection and processing, training and generation of the detection model, deployment of the detection model, and the application of the detection model. A process of data collection and processing includes: operations such as collecting the capacitance signals at the plurality of locations in a case that the liquid exists on the touch screen, manually marking the sample result, and filtering out irrelevant data, and further includes operations such as collecting the capacitance signals at the plurality of locations in a case that no liquid exists on the touch screen, manually marking the sample result and filtering out the irrelevant data. A process of training and generating the detection model includes: a result of the detection model is selected, the detection model is trained according to the collected capacitance signals of the plurality of locations and the sample result, and the trained detection model is generated. A process of deploying the detection model includes: the detection model is transformed into a TF lite (a format model) model that can be used by the terminal, and a TF lite model file, a dependency library file matched with the TF lite model file, and a model calling interface thread are configured in the terminal. A process of applying the detection model includes: after the terminal detects the touch operation on the touch screen, the detection result is obtained by calling the detection model to detect the capacitance signals at the plurality of locations of the touch operation.

In some examples, the dependency library stores a .so (a file format) file corresponding to the TF lite model.

303, the terminal determines, in a case of determining that the liquid exists on the touch screen based on the capacitance signals at the plurality of locations, the effective area of the touch operation by screening the plurality of locations.

In the example of the disclosure, if the terminal determines that the liquid exists on the touch screen, it means that the plurality of locations detected by the terminal include a position affected by the liquid. Thus, the detected plurality of locations need to be screened, the position affected by the liquid is filtered out, and then the effective area of the touch operation is determined according to the remaining locations.

In some examples, in the case of determining that the liquid exists on the touch screen based on the capacitance signals at the plurality of locations, a location where a capacitance value of the capacitance signal is less than a capacitance threshold among the plurality of locations is filtered out, and an area formed by remaining obtained locations is determined as the effective area of the touch operation.

In the case that the liquid exists on the touch screen, the liquid has a small impact on the capacitance value of the capacitance signals on the touch screen, while the touch operation triggered by the user has a large impact on the capacitance value of the capacitance signals on the touch screen. Thus, the capacitance threshold is set to filter out the location where the capacitance value of the capacitance signals is less than the capacitance threshold among the plurality of locations, that is, the location affected by the liquid is filtered out, the remaining locations are the locations corresponding to the touch operation, and the area formed by the remaining obtained locations is determined as the effective area of the touch operation.

For example, the capacitance threshold is 500 F (Farad). As shown in FIG. 5, the touch screen includes 144 locations, the capacitance value of the capacitance signal corresponding to each location is as shown in FIG. 5, and an area formed by the locations greater than 500 F may be considered as the effective area of the touch operation.

In some examples, in the case of determining that the liquid exists on the touch screen based on the capacitance signals at the plurality of locations, a target shape is determined based on the shape formed by the plurality of locations, a location that does not belong to the target shape among the plurality of locations is filtered out, and an area formed by remaining obtained locations is determined as the effective area of the touch operation.

The target shape is an ellipse, a circle, a rectangle or other shapes, which is not limited by the example of the disclosure. In the example of the disclosure, if the terminal determines that the liquid exists on the touch screen, the target shape is determined based on the shape formed by the plurality of locations, the target shape is considered as a shape corresponding to the touch operation, the location that does not belong to the target shape among the plurality of locations is filtered out, and the area formed by the remaining locations may be determined as the effective area of the touch operation.

For example, if the target shape is the ellipse, the terminal determines a location that can form the ellipse based on the plurality of locations, filters out a location that does not belong to the ellipse, and determines an area formed by the remaining locations as the effective area of the touch operation.

It should be noted that the example of the disclosure takes an example that step 303 is a possible implementation of the above-described step 202 to illustrate. The above-described step 202 further includes the following possible implementations.

In the case of determining that the liquid exists on the touch screen based on the capacitance signals at the plurality of locations, the terminal determines a target location forming the target shape based on the plurality of locations, and a capacitance value of the capacitance signal at the target location is maximum; a distance between the target location and other locations other than the location forming the target shape is acquired, where a capacitance value of the capacitance signals at other locations is a positive integer; and an area formed by other locations with the distance less than a preset distance and the location forming the target shape is determined as the effective area of the touch operation.

In the example of the disclosure, after the terminal determines the target shape, considering that the location before the target shape may also have the effective area of the touch operation, the target position corresponding to the capacitance signal with the maximum capacitance value in the target shape is taken as a center to acquire the distance between the target location and other locations other than the location forming the target shape. If there are other locations with the distance less than the preset distance, it may be considered that the area formed by these locations also belongs to the effective area of the touch operation, so the terminal determines the area formed by other locations with the distance less than the preset distance and the location forming the target shape as the effective area of the touch operation.

The target location is one or more of the locations that form the target shape. For example, as shown in FIG. 5, since the capacitance value of the capacitance signal at the target location is maximum, the target location may be a location where a capacitance value of the capacitance signal is 680.

Alternatively, a solution of judging whether the distance is less than the preset distance in the example of the disclosure may also be called a combination strategy, namely, a solution of combining other locations with the distance less than the preset distance into the target shape to expand the target shape.

The first point to be noted is that a solution of filtering out the location or combining a location meeting the demands into the target shape according to the distance involved in the disclosure may be called a host touch compute (HTC) algorithm.

Figure 6:
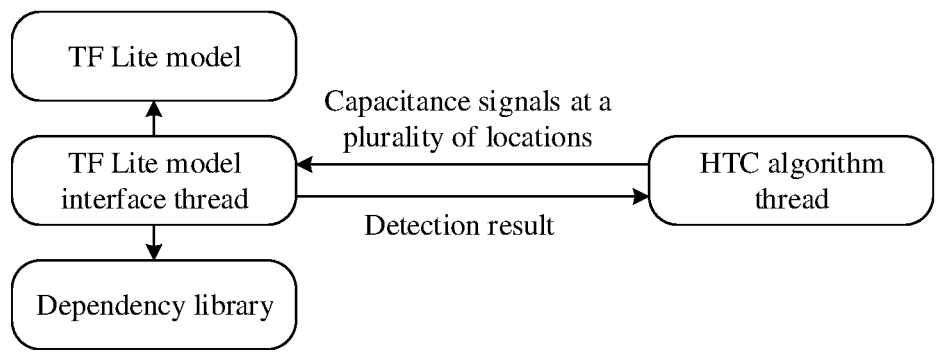
FIG. 6 is an application flow diagram of a detection model provided by an example of the disclosure.

Next, FIG. 6 is taken as an example to illustrate the solution of calling the TF lite model to detect the capacitance signals at the plurality of locations and using the HTC algorithm to determine the effective area of the touch operation in the disclosure. In the disclosure, the terminal acquires the capacitance signals at the plurality of locations through an HTC algorithm thread, and obtains the detection result by calling the TF lite model and a dependency library corresponding to the TF lite model through a TF lite model interface thread to detect the capacitance signals at the plurality of locations, the terminal calls the HTC algorithm thread to determine the effective area of the touch operation based on the detection result, and then the terminal executes the function corresponding to the touch operation.

It should be noted that the solutions in the above examples may further be combined with each other to form a new solution. In some examples, in the case of determining that the liquid exists on the touch screen based on the capacitance signals at the plurality of locations, the location where the capacitance value of the capacitance signal is less than the capacitance threshold among the plurality of locations is filtered out. For the remaining obtained locations, the target shape is determined based on the remaining locations, a location that does not belong to the target shape among the remaining locations is filtered out, and then an area formed by the last remaining locations is determined as the effective area of the touch operation.

304, the terminal executes a function corresponding to the touch operation based on the effective area of the touch operation.

The example of the disclosure provides a solution for eliminating interference of liquid existed on the touch screen to a detection operation. After the terminal detects the touch operation, if it is determined that the liquid exists on the touch screen according to the capacitance signals at the plurality of locations corresponding to the touch operation, the effective area of the touch operation is determined based on the plurality of locations, and then the function corresponding to the touch operation is executed, so as to eliminate the impact of the liquid on the touch operation, and improve the accuracy of the terminal to execute the function corresponding to the touch operation.

The disclosure provides various solutions to determine the effective area of the touch operation, expands a mode to determine the effective area of the touch operation, and ensures the accuracy of determining the effective area of the touch operation through comprehensive consideration.

Moreover, the disclosure may further filter the locations twice based on the capacitance threshold and the target shape, which improves the accuracy of determining the effective area of the touch operation, and then improves the accuracy of executing the function corresponding to the touch operation.

Figure 7:
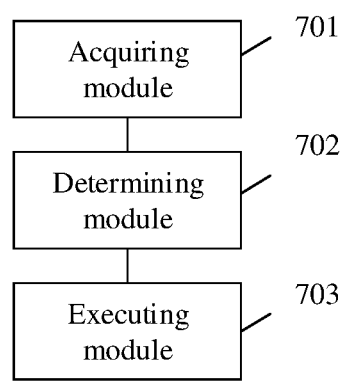
FIG. 7 is a schematic structural diagram of a touch control apparatus provided by an example of the disclosure.

FIG. 7 is a schematic structural diagram of a touch control apparatus provided by an example of the disclosure. As shown in FIG. 7, the apparatus includes:
  an acquiring module 701, configured to acquire, in response to a touch operation detected on a touch screen of a terminal, capacitance signals at a plurality of locations corresponding to the touch operation;
  a determining module 702, configured to determine, in a case of determining that liquid exists on the touch screen based on the capacitance signals at the plurality of locations, an effective area of the touch operation based on the plurality of locations; and
  an executing module 703, configured to execute a function corresponding to the touch operation based on the effective area of the touch operation.

In a possible implementation, the determining module 702 is configured to determine, in the case of determining that the liquid exists on the touch screen based on the capacitance signals at the plurality of locations, the effective area of the touch operation by screening the plurality of locations.

In a possible implementation, the determining module 702 is configured to:
  filter out, in the case of determining that the liquid exists on the touch screen based on the capacitance signals at the plurality of locations, a location where a capacitance value of the capacitance signal is less than a capacitance threshold among the plurality of locations; and determine an area formed by remaining obtained locations as the effective area of the touch operation.

In a possible implementation, the determining module 702 is configured to:

determine, in the case of determining that the liquid exists on the touch screen based on the capacitance signals at the plurality of locations, a target shape based on the shape formed by the plurality of locations;

filter out a location that does not belong to the target shape among the plurality of locations; and determine an area formed by remaining obtained locations as the effective area of the touch operation.

In a possible implementation, the determining module 702 is configured to:

determine, in the case of determining that the liquid exists on the touch screen based on the capacitance signals at the plurality of locations, a target location forming a target shape based on the plurality of locations, where a capacitance value of the capacitance signal at the target location is maximum;

acquire a distance between the target location and locations other than the location forming the target shape, where a capacitance value of the capacitance signals at other locations is a positive integer; and determine an area formed by other locations with the distance less than a preset distance and the location forming the target shape as the effective area of the touch operation.

Figure 8:
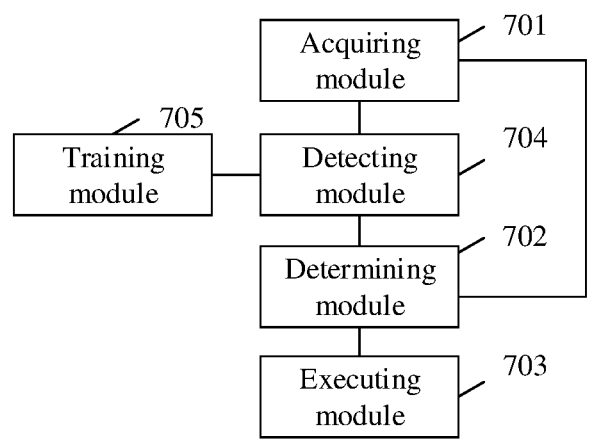
FIG. 8 is a schematic structural diagram of another touch control apparatus provided by an example of the disclosure.

In a possible implementation, referring to FIG. 8, the apparatus further includes:

a detection module 704, configured to obtain a detection result by detecting the capacitance signals at the plurality of locations, where the detection result indicates whether the liquid exists on the touch screen.

In a possible implementation, the step of obtaining the detection result by detecting the capacitance signals at the plurality of locations is implemented based on a detection model. Referring to FIG. 8, the apparatus further includes: a training module 705.

The training module 705 is configured to:

acquire a sample result of any touch operation, where the sample result indicates whether the liquid exists on the touch screen that triggers any touch operation;

obtain a predictive detection result by calling the detection model to detect the capacitance signals at the plurality of locations corresponding to any touch operation; and train the detection model based on the predictive detection result and the sample result of any touch operation.

It should be noted that when the apparatus provided by the above example performs a detection operation, the division of all above functional modules is used as an example for illustration. In practical applications, the above functions may be allocated to be completed by the different functional modules according to actual needs. That is, an internal structure of a terminal is divided into the different functional modules to complete all or part of the functions described above. In addition, the touch control apparatus provided by the above example and the touch control method example belong to the same concept, and its specific implementation process is detailed in the method example, which will not be repeated here.

Figure 9:
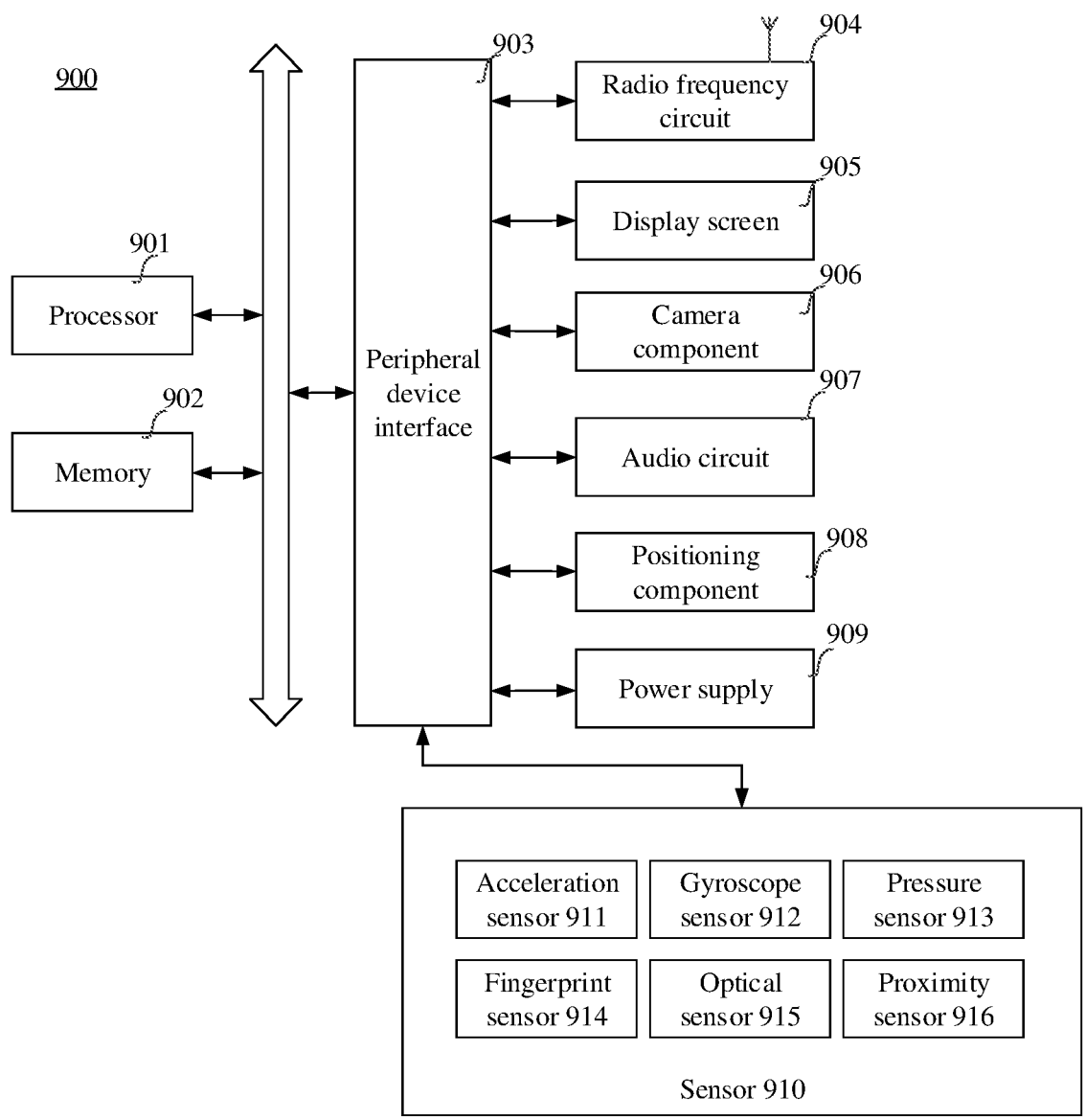
FIG. 9 is a schematic structural diagram of a terminal provided by an example of the disclosure.

FIG. 9 shows a structural block diagram of a terminal 900 provided by an example of the disclosure. The terminal 900 includes: a processor 901 and a memory 902.

The processor 901 may include one or more processing cores, such as a 4-core processor and an 8-core processor. The processor 901 may be implemented by adopting at least one hardware form of digital signal processing (DSP), a field-programmable gate array (FPGA), and a programmable logic array (PLA). The processor 901 may also include a main processor and a coprocessor. The main processor is a processor used to process data in a wakeup state, also known as a central processing unit (CPU); and the coprocessor is a low-power processor for processing data in a standby mode. In some examples, the processor 901 may be integrated with a graphics processing unit (GPU), and the GPU is used to render and draw content needing to be displayed on a display screen 905. In some examples, the processor 901 may further include an artificial intelligence (AI) processor, and the AI processor is used to process a computing operation related to machine learning.

The memory 902 may include one or more computer readable storage media, and the computer readable storage medium may be non-transitory. The memory 902 may further include a high-speed random access memory and a non-volatile memory, such as one or more disk storage devices and flash memory devices. In some examples, the non-transitory computer readable storage medium in the memory 902 is used to store at least one program code, and the at least one program code is used to be executed by the processor 901 to implement the touch control method provided by the method example in the disclosure.

In some examples, the terminal 900 further alternatively includes: a peripheral device interface 903 and at least one peripheral device. The processor 901, the memory 902 and the peripheral device interface 903 may be connected through a bus or a signal line. Each peripheral device may be connected with the peripheral device interface 903 through a bus, a signal line or a circuit board. The peripheral device includes at least one of a radio frequency circuit 904, a display screen 905, a camera 906, an audio circuit 907, a positioning component 908 and a power supply 909.

The peripheral device interface 903 may be used to connect at least one peripheral device associated with input/output (I/O) to the processor 901 and the memory 902. In some examples, the processor 901, the memory 902 and the peripheral device interface 903 are integrated on the same chip or circuit board. In some other examples, any one or two of the processor 901, the memory 902 and the peripheral device interface 903 may be implemented on a separate chip or circuit board, which is not limited in the present example.

The radio frequency circuit 904 is used to receive and transmit radio frequency (RF) signals, also known as electromagnetic signals. The radio frequency circuit 904 communicates with a communication network and other communication devices through the electromagnetic signals. The radio frequency circuit 904 converts electrical signals into the electromagnetic signals for sending, or converts the received electromagnetic signals into the electrical signals. Alternatively, the radio frequency circuit 904 includes: an antenna system, a RF transceiver, one or more amplifiers, a tuner, an oscillator, a digital signal processor, a codec chipset, a user identity module card, and the like. The radio frequency circuit 904 may communicate with other terminals through at least one wireless communication protocol. The wireless communication protocol includes but not limited to: a metropolitan area network, mobile communication networks of all generations (2G, 3G, 4G and 5G), a wireless local area network and/or a wireless fidelity (WiFi) network. In some examples, the radio frequency circuit 904 may further include circuits related to near field communication (NFC), which is not limited in the disclosure.

The display screen 905 is used to display a user interface (UI). The UI may include graphics, a text, an icon, a video and any combination of them. When the display screen 905 is a touch display screen, the display screen 905 further has the capability to collect a touch signal on or above a surface of the display screen 905. The touch signal may be taken as a control signal to be input to the processor 901 for processing. At this time, the display screen 905 may further be used to provide a virtual button and/or a virtual keyboard, also known as a soft button and/or a soft keyboard. In some examples, there may be one display screen 905, which is arranged on a front panel of the terminal 900. In some other examples, there may be at least two display screens 905, which are respectively arranged on different surfaces of the terminal 900 or in a folded design. In some yet other examples, the display screen 905 may be a flexible display screen, which is arranged on a curved surface or a folded surface of the terminal 900. Even, the display screen 905 may further be arranged as a non-rectangular irregular figure, namely, a special-shaped screen. The display screen 905 may be prepared by adopting materials such as a liquid crystal display (LCD), and an organic light-emitting diode (OLED).

The camera component 906 is used to collect images or videos. Alternatively, the camera component 906 includes a front camera and a rear camera. The front camera is arranged on the front panel of the terminal, and the rear camera is arranged on a back of the terminal. In some examples, there are at least two rear cameras, which is at least one of a main camera, a depth-of-field camera, a wide-angle camera, and a telephoto camera, to realize a background virtualization function through fusion of the main camera and the depth-of-field camera, and to realize panoramic shooting and virtual reality (VR) shooting functions, or other fusion shooting functions through fusion of the main camera and the wide-angle camera. In some examples, the camera component 906 may further include a flashlight. The flashlight may be a monochromatic temperature flashlight or a dichromatic temperature flashlight. The dichromatic temperature flashlight refers to a combination of warm light flashlight and a cold light flashlight, which may be used for light compensation under different color temperatures.

The audio circuit 907 may include a microphone and a speaker. The microphone is used to collect sound waves from a user and an environment, convert the sound waves into the electrical signals to be input into the processor 901 for processing, or input into the radio frequency circuit 904 to realize voice communication. For the purpose of stereo collection or noise reduction, there may be a plurality of microphones, which are respectively arranged at different parts of the terminal 900. The microphone may further be an array microphone or an omnidirectional collection microphone. The speaker is used to convert the electrical signals from the processor 901 or the radio frequency circuit 904 into the sound waves. The speaker may be a traditional film speaker or a piezoelectric ceramic speaker. When the speaker is the piezoelectric ceramic speaker, it cannot merely convert the electrical signals into human-audible sound waves, but also convert electrical signals into human-inaudible sound waves for ranging and other purposes. In some examples, the audio circuit 907 may further include a headset jack.

The positioning component 908 is used to position a current geographic location of the terminal 900 to achieve navigation or a location based service (LBS). The positioning component 908 may be a positioning component based on a global positioning system (GPS) of the United States, a Beidou system of China, a GLONASS system of Russia or a Galileo system of the European Union.

The power supply 909 is used to supply power to various components in the terminal 900. The power supply 909 may be alternating current, direct current, a disposable battery or a rechargeable battery. When the power supply 909 includes the rechargeable battery, the rechargeable battery may support wired charging or wireless charging. The rechargeable battery may further be used to support a fast charging technology.

In some examples, the terminal 900 further includes one or more sensors 910. The one or more sensors 910 include but not limited to: an acceleration sensor 911, a gyroscope sensor 912, a pressure sensor 913, a fingerprint sensor 914, an optical sensor 915 and a proximity sensor 916.

The acceleration sensor 911 may detect an acceleration on three coordinate axes of a coordinate system established by the terminal 900. For example, the acceleration sensor 911 may be used to detect components of a gravitational acceleration on the three coordinate axes. The processor 901 may control the display screen 905 to display the user interface in a horizontal view or vertical view according to a gravitational acceleration signal collected by the acceleration sensor 911. The acceleration sensor 911 may further be used to collect motion data of games or the user.

The gyroscope sensor 912 may detect a body direction and rotation angle of the terminal 900. The gyroscope sensor 912 may cooperate with the acceleration sensor 911 to collect the 3D actions of the user to the terminal 900. According to the data collected by the gyroscope sensor 912, the processor 901 may realize the following functions: motion sensing (such as changing the UI according to a tilt operation of the user), image stabilization during shooting, game control and inertial navigation.

The pressure sensor 913 may be arranged on a side frame of the terminal 900 and/or a lower layer of the display screen 905. When the pressure sensor 913 is arranged on the side frame of the terminal 900, a grip signal of the user on the terminal 900 may be detected, and the processor 901 identifies left and right hands or operates quickly according to the grip signal collected by the pressure sensor 913. When the pressure sensor 913 is arranged at the lower layer of the display screen 905, the processor 901 controls an operability control on the UI according to a pressure operation of the user on the display screen 905. The operability control includes at least one of a button control, a scroll bar control, an icon control and a menu control.

The fingerprint sensor 914 is used to collect fingerprints of the user. The processor 901 identifies identity of the user according to the fingerprints collected by the fingerprint sensor 914, or the fingerprint sensor 914 identifies the identity of the user according to the collected fingerprints. When the identity of the user is identified as a trusted identity, the processor 901 authorizes the user to execute relevant sensitive operations, and the sensitive operations include unlocking the screen, viewing encrypted information, downloading software, paying and changing settings. The fingerprint sensor 914 may be arranged on the front, back or side face of the terminal 900. When the terminal 900 is provided with a physical key or a manufacturer logo, the fingerprint sensor 914 may be integrated with the physical key or the manufacturer logo.

The optical sensor 915 is used to collect ambient light intensity. In one example, the processor 901 may control display brightness of the display screen 905 according to the ambient light intensity collected by the optical sensor 915. When the ambient light intensity is high, the display brightness of the display screen 905 is turned up; and when the ambient light intensity is low, the display brightness of the display screen 905 is turned down. In another example, the processor 901 may further dynamically adjust shooting parameters of the camera component 906 according to the ambient light intensity collected by the optical sensor 915.

The proximity sensor 916, also known as a distance sensor, is arranged on the front panel of the terminal 900. The proximity sensor 916 is used to collect a distance between the user and the front of the terminal 900. In one example, when the proximity sensor 916 detects that the distance between the user and the front of the terminal 900 gradually decreases, the processor 901 controls the display screen 905 to switch from a screen bright state to a screen rest state. When the proximity sensor 916 detects that the distance between the user and the front of the terminal 900 gradually increases, the processor 901 controls the display screen 905 to switch from the screen rest state to the screen bright state.

Those skilled in the art can understand that a structure shown in FIG. 9 does not constitute a restriction on the terminal 900, and may include more or fewer components than those shown in the figure, or combine some components, or adopt different component arrangements.

Figure 10:
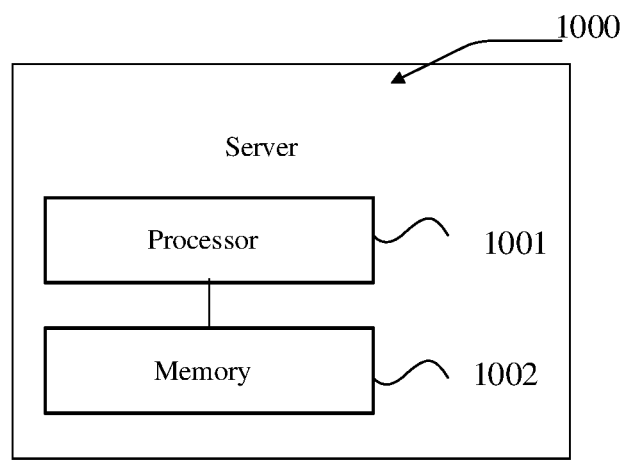
FIG. 10 is a schematic structural diagram of a server provided by an example of the disclosure.

FIG. 10 is a schematic structural diagram of a server provided by an example of the disclosure. The server 1000 may vary greatly due to different configurations or performance, and may include one or more processors (central processing units, CPUs) 1001 and one or more memories 1002. At least one program code is stored in the memory 1002, and the at least one program code is loaded and executed by the processor 1001 to implement the methods provided by all the above method examples. Certainly, the server may further have a wired or wireless network interface, a keyboard, an input and output interface and other parts for input and output. The server may further include other parts for realizing device functions, which will not be repeated here.

The server 1000 is used to execute the steps executed by the server in the above method examples.

In an example, a computer readable storage medium is further provided, such as a memory including a program code. The above program code may be executed by a processor in a computing device so as to complete the touch control method in the above examples. For example, the computer readable storage medium may be an ROM, a random access memory (RAM), a CD-ROM, a magnetic tape, a floppy disk, an optical data storage device and the like.

In an example, a computer program or a computer program product is further provided. The computer program or the computer program product includes a computer program code. The computer program code, when executed by a computer, causes the computer to implement the touch control method in the above examples.

Those skilled in the art can understand that implementation of all or part of the steps of the above examples may be completed by hardware, or may be completed by instructing relevant hardware through programs. The programs may be stored in a computer readable storage medium. The storage medium mentioned above may be a read only memory, a disk, or an optical disk and the like.

The above is an optional example of the disclosure and is not intended to limit the disclosure. Any modification, equivalent substitution, improvement and the like made within the spirit and principle of the disclosure shall all be contained in the scope of protection of the disclosure.

What is claimed is:

1. A touch control method, comprising:
    acquiring, in response to a touch operation detected on a touch screen of a terminal, capacitance signals at a plurality of locations corresponding to the touch operation;
    determining, in a case of determining that liquid exists on the touch screen based on the capacitance signals at the plurality of locations, an effective area of the touch operation based on the plurality of locations; and
    executing a function corresponding to the touch operation based on the effective area of the touch operation;
    wherein determining, in the case of determining that the liquid exists on the touch screen based on the capacitance signals at the plurality of locations, the effective area of the touch operation based on the plurality of locations comprises:
        determining, in the case of determining that the liquid exists on the touch screen based on the capacitance signals at the plurality of locations, a target location forming a target shape based on the plurality of locations, wherein the target shape is at least one of an ellipse, a circle or a rectangle, and a capacitance value of the capacitance signal at the target location is maximum;
        acquiring a distance between the target location and other locations other than the location forming the target shape, wherein a capacitance value of the capacitance signals at the other locations is a positive integer; and
        determining an area formed by the other locations with the distance less than a preset distance and the location forming the target shape as the effective area of the touch operation.

2. The touch control method according to claim 1, wherein determining, in the case of determining that the liquid exists on the touch screen based on the capacitance signals at the plurality of locations, the effective area of the touch operation based on the plurality of locations comprises:
    determining, in the case of determining that the liquid exists on the touch screen based on the capacitance signals at the plurality of locations, the effective area of the touch operation by screening the plurality of locations.

3. The touch control method according to claim 2, wherein determining, in the case of determining that the liquid exists on the touch screen based on the capacitance signals at the plurality of locations, the effective area of the touch operation by screening the plurality of locations comprises:
    filtering out, in the case of determining that the liquid exists on the touch screen based on the capacitance signals at the plurality of locations, a location where a capacitance value of the capacitance signal is less than a capacitance threshold among the plurality of locations; and
    determining an area formed by remaining obtained locations as the effective area of the touch operation.

4. The touch control method according to claim 2, wherein determining, in the case of determining that the liquid exists on the touch screen based on the capacitance signals at the plurality of locations, the effective area of the touch operation by screening the plurality of locations comprises:

determining, in the case of determining that the liquid exists on the touch screen based on the capacitance signals at the plurality of locations, a target shape based on a shape formed by the plurality of locations;

filtering out a location that does not belong to the target shape among the plurality of locations; and determining an area formed by remaining obtained locations as the effective area of the touch operation.

5. The touch control method according to claim 1, further comprising:

obtaining a detection result by detecting the capacitance signals at the plurality of locations, wherein the detection result indicates whether the liquid exists on the touch screen.

6. The touch control method according to claim 5, wherein obtaining the detection result by detecting the capacitance signals at the plurality of locations is implemented based on a detection model, and the touch control method further comprises:

acquiring a sample result of any touch operation, wherein the sample result indicates whether the liquid exists on the touch screen that triggers any touch operation;

obtaining a predictive detection result by calling the detection model to detect the capacitance signals at the plurality of locations corresponding to any touch operation; and training the detection model based on the predictive detection result and the sample result of any touch operation.

7. A terminal, comprising one or more processors and one or more memories, wherein at least one program code is stored in the one or more memories, and the one or more processors are configured to load and execute the at least one program code to:

acquire, in response to a touch operation detected on a touch screen of the terminal, capacitance signals at a plurality of locations corresponding to the touch operation;

determine, in a case of determining that liquid exists on the touch screen based on the capacitance signals at the plurality of locations, an effective area of the touch operation based on the plurality of locations; and execute a function corresponding to the touch operation based on the effective area of the touch operation;

wherein the one or more processors are configured to:

determine, in the case of determining that the liquid exists on the touch screen based on the capacitance signals at the plurality of locations, a target location forming a target shape based on the plurality of locations, wherein the target shape is at least one of an ellipse, a circle or a rectangle, and a capacitance value of the capacitance signal at the target location is maximum;

acquire a distance between the target location and other locations other than the location forming the target shape, wherein a capacitance value of the capacitance signals at the other locations is a positive integer; and determine an area formed by the other locations with the distance less than a preset distance and the location forming the target shape as the effective area of the touch operation.

8. The terminal according to claim 7, wherein the one or more processors are configured to:

determine, in the case of determining that the liquid exists on the touch screen based on the capacitance signals at the plurality of locations, the effective area of the touch operation by screening the plurality of locations.

9. The terminal according to claim 8, wherein the one or more processors are configured to:

filter out, in the case of determining that the liquid exists on the touch screen based on the capacitance signals at the plurality of locations, a location where a capacitance value of the capacitance signal is less than a capacitance threshold among the plurality of locations; and determine an area formed by remaining obtained locations as the effective area of the touch operation.

10. The terminal according to claim 8, wherein the one or more processors are configured to:

determine, in the case of determining that the liquid exists on the touch screen based on the capacitance signals at the plurality of locations, a target shape based on a shape formed by the plurality of locations;

filter out a location that does not belong to the target shape among the plurality of locations; and determine an area formed by remaining obtained locations as the effective area of the touch operation.

11. The terminal according to claim 7, wherein the one or more processors are further configured to:

obtain a detection result by detecting the capacitance signals at the plurality of locations, wherein the detection result indicates whether the liquid exists on the touch screen.

12. The terminal according to claim 11, wherein obtaining the detection result by detecting the capacitance signals at the plurality of locations is implemented based on a detection model, the one or more processors are further configured to:

acquire a sample result of any touch operation, wherein the sample result indicates whether the liquid exists on the touch screen that triggers any touch operation;

obtain a predictive detection result by calling the detection model to detect the capacitance signals at the plurality of locations corresponding to any touch operation; and train the detection model based on the predictive detection result and the sample result of any touch operation.

13. A non-transitory computer readable storage medium, wherein the non-transitory computer readable storage medium stores at least one program code, and a processor is configured to load and execute the at least one program code to:

acquire, in response to a touch operation detected on a touch screen of a terminal, capacitance signals at a plurality of locations corresponding to the touch operation;

determine, in a case of determining that liquid exists on the touch screen based on the capacitance signals at the plurality of locations, an effective area of the touch operation based on the plurality of locations; and execute a function corresponding to the touch operation based on the effective area of the touch operation;

wherein the processor is configured to:

determine, in the case of determining that the liquid exists on the touch screen based on the capacitance signals at the plurality of locations, a target location forming a target shape based on the plurality of locations, wherein the target shape is at least one of an ellipse, a circle or a rectangle, and a capacitance value of the capacitance signal at the target location is maximum;

acquire a distance between the target location and other locations other than the location forming the target shape, wherein a capacitance value of the capacitance signals at the other locations is a positive integer; and determine an area formed by the other locations with the distance less than a preset distance and the location forming the target shape as the effective area of the touch operation.

14. The non-transitory computer readable storage medium according to claim 13, wherein the processor is configured to:

determine, in the case of determining that the liquid exists on the touch screen based on the capacitance signals at the plurality of locations, the effective area of the touch operation by screening the plurality of locations.

15. The non-transitory computer readable storage medium according to claim 14, wherein the processor is configured to:

filter out, in the case of determining that the liquid exists on the touch screen based on the capacitance signals at the plurality of locations, a location where a capacitance value of the capacitance signal is less than a capacitance threshold among the plurality of locations; and determine an area formed by remaining obtained locations as the effective area of the touch operation.

16. The non-transitory computer readable storage medium according to claim 14, wherein the processor is configured to:

determine, in the case of determining that the liquid exists on the touch screen based on the capacitance signals at the plurality of locations, a target shape based on a shape formed by the plurality of locations;

filter out a location that does not belong to the target shape among the plurality of locations; and determine an area formed by remaining obtained locations as the effective area of the touch operation.

17. The non-transitory computer readable storage medium according to claim 13, wherein the processor is configured to:

obtain a detection result by detecting the capacitance signals at the plurality of locations, wherein the detection result indicates whether the liquid exists on the touch screen.

\* \* \* \* \*